United States Patent [19]

Ando et al.

[11] Patent Number: 5,039,555

[45] Date of Patent: Aug. 13, 1991

[54] METHOD OF PREPARING LUBRICANT FOR RECORDING MEDIA

[75] Inventors: Eiji Ando, Katano; Yoshiki Goto, Nara; Yosio Okahata, Kawasaki, all of Japan

[73] Assignee: Matsushita Electric Industrial Co., Ltd., Osaka, Japan

[21] Appl. No.: 417,483

[22] Filed: Oct. 5, 1989

[30] Foreign Application Priority Data

Oct. 12, 1988 [JP] Japan ................................ 63-256345
Oct. 12, 1988 [JP] Japan ................................ 63-256346
Oct. 24, 1988 [JP] Japan ................................ 63-267415
Oct. 24, 1988 [JP] Japan ................................ 63-267416
Jan. 31, 1989 [JP] Japan ................................ 01-021407

[51] Int. Cl.$^5$ ............................................. H01F 10/02
[52] U.S. Cl. .................................... 427/131; 427/132
[58] Field of Search .......................... 427/127–132, 427/48; 428/695, 900

[56] References Cited

U.S. PATENT DOCUMENTS 3,996,407 12/1976 Von Gross et al. ................. 428/323
4,152,487 5/1979 Yanagisawa ........................ 428/621

OTHER PUBLICATIONS

Patent Abstracts of Japan, vol. 12, No. 319 (P751)(3166), 30th Aug. 1988; & JP-A-63 83 917 (Matsushita Electric Ind. Co., Ltd) 14-04-1988 (Abstract).
Patent Abstracts of Japan, vol. 12, No. 319 (P-751)(3166), 30th Aug. 1988; & JP-A-63 83 918 (Matsushita Electric Ind. Co., Ltd) 14-04-1988 (Abstract).

*Primary Examiner*—Bernard Pianalto
*Attorney, Agent, or Firm*—Stevens, Davis, Miller & Mosher

[57] ABSTRACT

A lubricant for recording media having excellent sliding characteristics and abrasion resistance is obtained when an alkylsilane of the following formula (I) is prepared in a thin layer with the LB method:

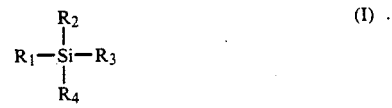

Example of the alkylsilane include γ-(N,N-dioctadecylsuccinylamino)propyltriethoxysilane and γ-[N-[tris-(heptadecylyloxymethyl)] methylsuccinylamino]-propyltriethoxysilane.

4 Claims, 3 Drawing Sheets

F I G. 1
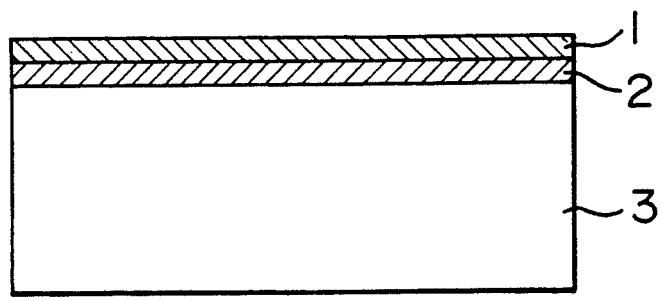
F I G. 2
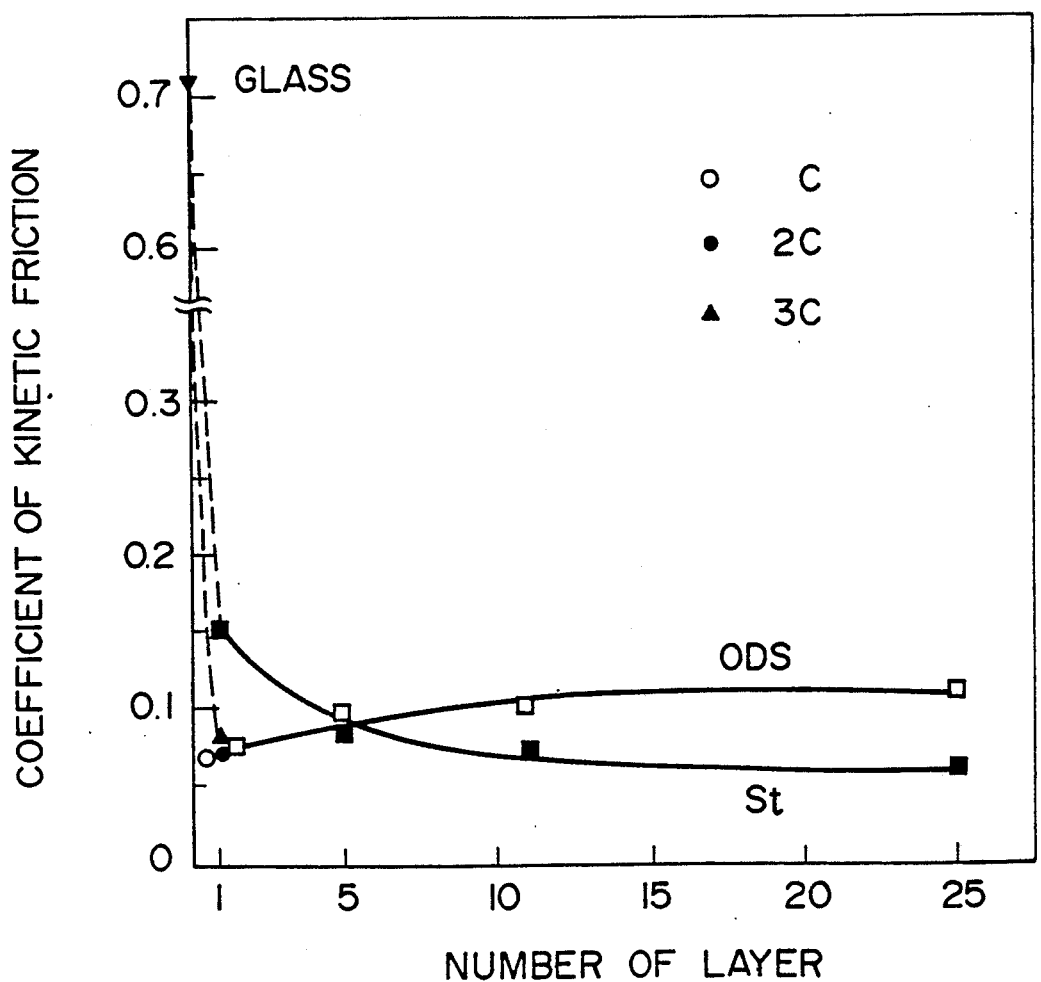

METHOD OF PREPARING LUBRICANT FOR RECORDING MEDIA

The present invention relates to a lubricant for recording media that are used in the information industry and other fields, and further to a method for making lubricating layers with the lubricant on recording media.

Lubricating layers are required to cover recording media of the thin metal film type which comprise substrate and recording layers formed thereon by direct plating, sputtering, vacuum deposition, ion plating, or other thin-film depositing methods.

During signal recording or reproduction, recording media of the thin metal film type are brought into contact with recorder heads and are rubbed or abraded therewith forming abrasion dusts to result damages. Accordingly, various measures are taken such as reduction in the friction coefficient and enhancement of the abrasion resistance by forming lubricating layers on the recording media. These lubricating layers should be sufficiently thin in order to lessen the spacing loss. An example of the measure is to laminate on recording media lubricating layers of a higher fatty acid or fluoro-polymer alone or in combination with a surface treating agent (Japanese Patent Kokai No. 59-172159). Although an improvement in the tracing or sliding characteristics is achieved, this measure is unsatisfactoy in that such lubricating layers peel off or deteriorate in the course of time.

Accordingly, it is an object of the present invention to provide a lubricant for recording media which is excellent in the sliding characteristics and abrasion resistance.

It is another object of the present invention to provide a method for preparing lubricating layers with said lubricant on recording media.

A lubricant pertaining to the present invention comprises an alkylsilane represented by the formula (I);

wherein, at least one of $R_1$-$R_4$ is a linear or branched hydrocarbon or fluoro-hydrocarbon chain containing or not-containing at least one an amino group, carboxy group, or ether bond, and the remaining $R_1$-$R_4$ are selected from halogen atoms, alkoxy, carboalkoxy, carboxy, hydroxy, and phenoxy groups.

When the alkylsilane of formula (I) is caused to form a lubricating layer on a recording medium, silyl groups of the alkylsilane link firmly to the recording medium and the surface density of hydrocarbon chains or fluoro-hydrocarbon chains increases, thereby enhancing the cohesive force in the lubricating layer. Further, Si atoms of the alkylsilane are aligned near the surface of recording medium while hydrocarbon chains or fluorohydrocarbon chains are arranged apart from the surface of recording medium.

The method for preparing lubricating layers according to the present invention includes forming a film with a lubricant comprising an alkylsilane represented by formula (I) on a recording medium by the Langmuir-Blodgett (LB) method or an adsorption method.

The thus formed alkylsilane film is a lubricating layer in which the Si atoms link through covalent bonds to the surface of recording medium and the alkyl chains are packed densely.

Under an appropriate number of branches in the hydrocarbon chains or in the fluoro-hydrocarbon chains, alkylsilane molecules readily form a closely packed structure and hence a markedly condensed film is obtained. As the result, shear strength of the lubricating film is raised to make the recording medium exhibit high endurance against repeated operations, and direct contact of the recording medium with the recording head is prevented sufficiently during such operations. This is also due to the more improved properties of the alkylsilane film formed by the LB method or the adsorption method. The alkylsilane film formed by the LB method can, even when it is monomolecular layer, exhibit sufficient effects.

BRIEF DESCRIPTION OF THE DRAWINGS

FIG. 1 is a cross-sectional view of a recording medium having an alkylsilane-containing lubricating layer on one side.

FIG. 2 is a chart showing the results of the test in Example 1.

DESCRIPTION OF THE PREFERRED EMBODIMENTS

Figure 3:
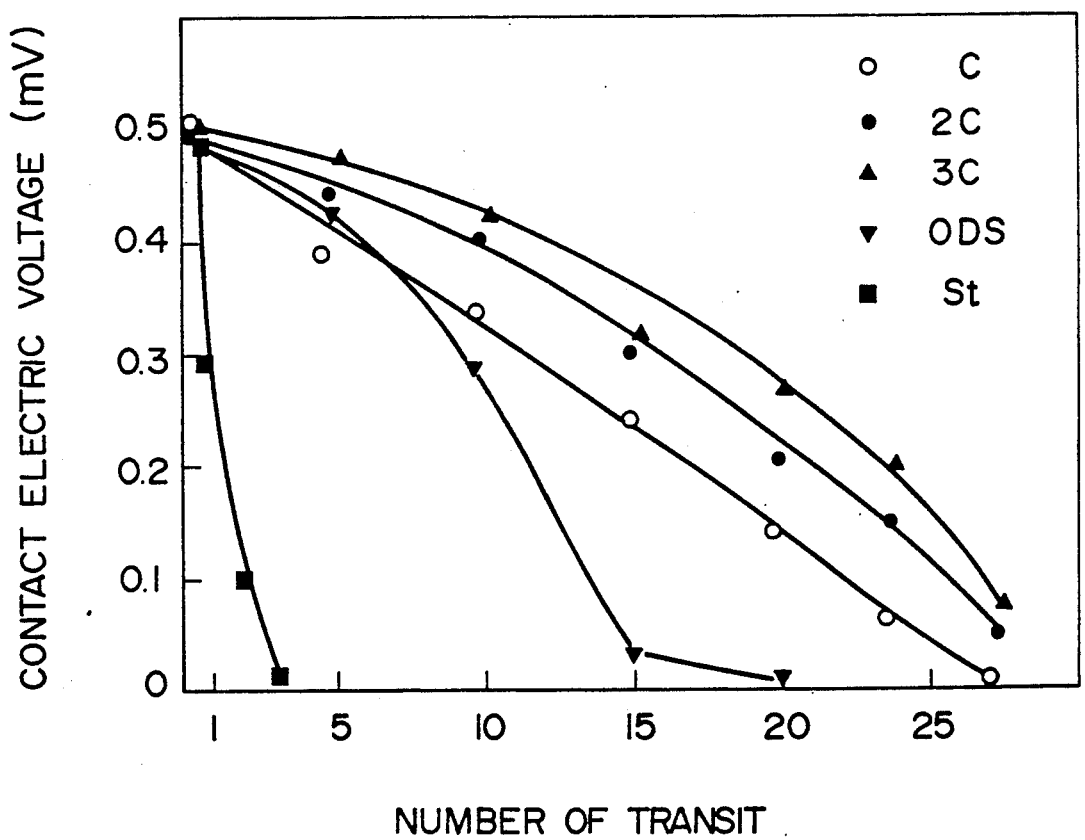
FIG. 3 is a chart showing the results of the test in Example 2.

FIG. 1 is a cross-sectioned view of a recording medium having an alkylsilane containing lubricating layer on one side. In this drawing, 1 is a substrate, 2 the recording medium, and 3 the alkylsilane-containing lubricating layer.

Suitable substrates 1 for use in the present invention to support recording media include films and plates made of known materials such as macromolecular materials, e.g. polyamide, polyimide, polysulfone, polycarbonate, polypropylene, polyethylene, polyethylene terephthalate, cellulose acetate, and polyvinyl chloride, non-magnetic metals, and ceramic materials such as glass and porcelain.

The magnetic material to form recording medium 2 is at least one metal selected from Fe, Co, and Ni or an alloy of any of these metals with at least one material selected from Mn, Cr, Ti, P, Y, Sm, Bi, and their oxides. In particular, a material constituted of at lest two elements selected from Co, Cr, and Ni is preferable because of having a high magnetic anisotropic energy and a sufficient corrosion resistance. From these magnetic materials, recording media can be formed on substrates by vacuum deposition, sputtering, ion plating, common plating, or other thin film depositing method.

The lubricating layer 3 is made of an alkylsilane-containing lubricant. This alkylsilane is represented by formula (I), wherein $R_1$-$R_4$ are preferred to be 16–22C hydrocarbon chains or 6–14C fluoro-hydrocarbon chains each having two or three branches. Of these, particularly preferred are; two-branched type alkylsilanes such as γ-(N,N-dioctadecylsuccinylamino)propyltriethoxysilane; three-branched type alkylsilanes such as γ-[N-[tris(heptadecyloxymetyl)]-methylsuccinylamino]propyltriethoxysilane; linear type alkylsilanes such as γ-(N-octadecylsuccinylamino)propyltriethoxysilane, γ-(N-heptadecylsuccinylamino)propyltriethoxysilane, and γ-(N-eicosylsuccinylamino)propyltriethoxysilane; and fluorine-containing alkylsilanes such as 1H,1H,2H,2H-perfluorodecylamido-propyltriethoxysilane, 1H,1H-perfluorodecylamido-propyltriethoxysilane, and perfluorodecylamido-propyltriethoxysilane, because these alkylsilanes exhibit good film forming properties and are easy to handle.

Suitable methods for preparing the lubricating layer on the recording medium are the LB method and an adsorption method, of which the LB method is preferable. The lubricating layer is desirably as thin as possible in view of signal recording and reproduction characteristics of the recording medium. The thickness is desired to be up to 500 Å unless the spacing loss brings about any drop in the recording output. In some cases, a monomolecular lubricating layer is preferred.

It is also an effective method for obtaining a superior lubricating layer that the formed alkylsilane lubricant film is further treated with a solution of higher hydrocarbons such as a higher saturated hydrocarbon, saturated fluoro-hydrocarbon, fatty acid, fatty acid amide, or alphatic alcohol or with a solution of higher fluorohydrocarbons.

According to the present invention, alkylsilane-containing lubricant layers are formed on recording media, where oriented lubricant molecules are firmly bonded to recording media and additionally the hydrocarbon or fluorohydrocarbon chains of the lubricant exhibit the effect of their low coefficient of kinetic friction; hence it is possible to provide recording media excellent in durability.

The present invention is illustrated in more detail with reference to the following non-restrictive examples.

EXAMPLE 1

Using each of n-octadecyltriethoxysilane (ODS), γ-(N-octadecylsuccinylamino)propyltriethoxysilane (C), γ-(N,N-dioctadecylsuccinylamino)propyltriethoxysilane (2C), γ-[N-[tris(heptadecyloxymethyl)]methylsuccinylamino]propyltriethoxysilane (3C), and a well-known lubricant of stearic acid (St), lubricating films were formed on substrates (flat smooth glass plates of about 20 Å surface roughness) by the LB method under conditions shown in Table 1.

TABLE 1

| Film material | Alkylsilanes (DDS, C, 2C, and 3C) | St |
|---|---|---|
| Concentration of film material in solvent | 1 mM, in benzene-ethanol (containing ethanol 10 v/v %) | 1 mM, in benzene |
| Sub-phase used | pH 2, 20° C. $H_2SO_4$ $10^{-2}$ M | pH 6.5, 18° C. $BaCl_2$ $4 \times 10^{-4}$ M $KHCO_3$ $5 \times 10^{-5}$ M |
| Surface pressure | 40 mN/m | 30 mN/m |

For the purpose of examining frictional properties of each lubricating layer, its kinetic friction coefficient ($\mu k$) was measured by using a reciprocating type friction coefficient meter (Model DF-PM, supplied by Kyowa Kaimen-Kagaku Co., Ltd.) and a 12 mm φ high-carbon chrome steel ball (6R, SUJ2) as a friction head (slider) under the conditions of 10 gf load (w) and 1.0 mm/s sliding speed (v). Results of the measurement are shown in FIG. 2.

As to 1-, 5-, 11-, and 25-built-up lubricating layers formed from ODS, the $\mu k$ of monomolecular layer was 0.07, which is much smaller than the $\mu k$ (0.7) of the untreated substrate. Thus the monomolecular layer from ODS was found to exhibit marked lubricating effect. As the thickness of lubricating layer was increased, the $\mu k$ increased and 11- and largeγ-built-up layers showed a constant $\mu k$ of 0.15. As to the lubricating layers from stearic acid, the $\mu k$ of monomolecular layer was 0.15 and as the thickness was increased, the $\mu k$ decreased. From these results, the monomolecular layer formed from such an alkylsilane as ODS was found to be a lubricating layer excellent in tracing property or sliding property. The $\mu k$'s of monomolecular layers formed from C, 2C, and 3C were 0.07, 0.07, and 0.08, respectively. This also proved that these alkylsilanes provide most effective tracing properties while avoiding the spacing loss. This is conceivably because the silyl groups of each alkylsilane are attached to the substrate and the hydrocarbon chains having lubricating activity extend upright on the side opposite to the substrate surface. Alkylsilanes having such configurations of segments may act effectively on the tracing property.

As shown in Example 1, a monomolecular lubricant layer offering an excellent tracing property can be obtained from an alkylsilane which has (i) linear or two- or three-branched type alkyl chains containing or not-containing at least one of an amino group, carboxy group, and ether bond and (ii) hydrolyzable alkoxy groups such as ethoxy groups.

EXAMPLE 2

Samples of monomolecular layers were prepared with ODS, C, 2C, 3C, and St on substrates, and tested for the abrasion resistance. The test was conducted by the electric contact resistance method using an instrument made by incorporating with the friction coefficient meter mentioned in Example 1 a circuit to which a voltage of 0.5 mV d.c. was applied. The test conditions were as follows: friction head = 6R SUJ 2, w = 5 fg, and v = 0.5 mm/s. The substrates used were prepared by vapor deposition of aluminum to 2000 Å thickness on glass plates. The abrasion resistance of each sample was determined by (i) detecting a potential which appeared when the friction head was brought into direct contact with a surface of the aluminum by a break of the lubricating film under tracing, (ii) comparing the number of passes or transits achieved before this break with those determined on the other samples, and (iii) observing the surface of each sample after these passes. Results of this test are shown in FIG. 3.

As shown in FIG. 3, the abrasion resistance of the lubricating film formed with St was as low as one pass or less causing the direct contact of the friction head with the aluminum while the abrasion resistance of the lubricating films formed with the alkylsilanes was about 10-20 times as high as that of the former lubricating film. Further, the result of the surface observation after passes was that the sample formed with St showed severe scratches in the center portion of the track while the samples formed with the alkylsilanes showed scratches uniformly distributed throughout the tracks and the abrasion of these samples was slight. Thus these lubricating films, bonded strongly to the substrates, are not readily peeled therefrom during repeated operations, indicating improved abrasion resistance. The increase in the abrasion resistance with the increasing number of alkyl chains in the alkylsilane molecule is conceivably caused by an increase in the surface density of lubricating layer. It proves that the effect of improving the abrasion resistance is exhibited adequately when the hydrocarbon chain of alkylsilane has 16 to 22 carbon atoms.

EXAMPLE 3

A built-up film was formed from 1H,1H-perfluorodecylamido-propyltriethoxysilane (FC) under the same conditions as those from C in Example 1, and properties of the film were compared with those of the film with C. The $\mu k$ values of these films were measured by using separately a 6-R SUJ 2 ball (point contact) and a 10 mm × 10 mm, SUJ 2 cube (surface contact) as friction heads under the conditions: w=20 gf and v=1.0 mm. The contact angle between the built-up film and water was also measured (30 seconds after 2.5-$\mu l$ water was dropped). Results of these measurements are shown in Table 2.

TABLE 2

|  | FC | C |
| --- | --- | --- |
| $\mu k$ in point contact | 0.08 | 0.07 |
| $\mu k$ in surface contact | 0.07 | 1.3 |
| Contact angle (degree) | 93 | 76 |

As shown in Table 2, the $\mu k$ of the film formed with FC was small similar to that of the film formed with C in the case of point contact, but was also small dissimilar to that of the latter film in the case of surface contact. It is considered that this friction-reducing effect will be produced by a low energy outermost surface formed of fluorocarbon chains of FC.

Thus, a recording medium having a low friction coefficient and high abrasion resistance can be produced effectively by forming a lubricating layer with such an alkylsilane having fluorine-containing hydrocarbon chains as used in this example making the hydrocarbon chains form the outermost surface. It has been verified that such fluorine-containing alkylsilanes are favorably applied to recording media for use in operations including point contact as well as surface contact with recorder heads.

EXAMPLE 4

Substrates on which monomolecular films were formed from an n-hexadecyltriethoxysilane were immersed in solutions containing 3-$\mu l$ additives shown in Table 3. After 30-minutes stirring, films were taken out and dried at temperatures (about 50° and 100° C.) necessary to evaporate the solvents, thereby forming samples of lubricated recording media.

These samples were tested for abrasion resistance by the electric contact resistance method under the operating conditions: w=10 gf and v=0.5 mm/s. Results of the test are shown in Table 3.

TABLE 3

| Solution | | Number of tracing | Surface observation after tracing |
| --- | --- | --- | --- |
| Additive | Solvent | | |
| $C_{20}F_{44}$ | Chloroform | >17 | Sparse scratches |
| $C_{22}F_{45}NH_2$ | Chloroform | 13–16 | Sparse scratches |

TABLE 3-continued

| Solution | | Number of tracing | Surface observation after tracing |
| --- | --- | --- | --- |
| Additive | Solvent | | |
| $C_{16}F_{34}$ | Chloroform | >15 | A trace of scratches |
| $C_{16}H_{33}OH$ | Hexadecane | 14–18 | A few scratches |
| $C_{20}H_{44}$ | Hexadecane | >15 | A few scratches |
| $C_{22}H_{45}COOH$ | Hexadecane | 15–18 | A trace of scratches |
| None | | 8–10 | Some scratches |

It is revealed that the addition of such a compound as shown in Table 3 to a monomolecular layer formed from the above alkylsilane results in such improvement of abrasion resistance that the number of tracing is increased or the development of scratches is avoided.

Consequently, monomolecular lubricant layers formed with such an alkylsilane as used above on recording media can be improved by incorporating a compound such as saturated higher hydrocarbons and higher fluorocarbons including acids, amides and alcohols into the lubricating layers.

EXAMPLE 5

On glass plates, 1500 Å thick recording layers of Co-Cr (Co:Cr=80:20 wt %, confirmed by atomic absorption spectroscopy) were formed by a continuous vapor deposition method. On these recording layers were formed severally built-up films of different numbers of monomolecular layers with lubricants [$\gamma$-(N-octadecylsuccinylamino)propyltriethoxysilane (C) and $\gamma$-(N,N-dioctadecylsuccinylamino)propyltriethoxysilane (2C) by the LB method. These built-up films were tested for $\mu k$ values (in the initial stage of passes and after 50 passes) under the conditions: friction head=6R SUJ2, w=10 gf, and v=1.0 mm/s, and the surfaces of these films were observed after 50 passes. Results of the test are shown in Table 4.

TABLE 4

| Structure of built-up film | | $\mu k$ | | Surface observation after 50 passes |
| --- | --- | --- | --- | --- |
| Lubricant | Number of monomolecular layers | Initial stage | After 50 passes | |
| C | 5 | 0.22 | 0.2 | A trace of scratches |
| C | 11 | 0.25 | 0.23 | A trace of scratches |
| 2C | 5 | 0.3 | 0.27 | A few scratches |
| 2C | 11 | 0.25 | 0.35 | A trace of scratches |
| 2C | 19 | 0.25 | 0.35 | No scratch or fault |
| Untreated recording layer | | 0.35 | 0.85 | Severe scratches |

The recording layer untreated with any lubricant showed high $\mu k$ values from the initial stage and severe scratches were observed at this layer surface after 50 passes. In contrast, the recording layers covered with built-up lubricant films exhibited low $\mu k$ values, and on their surface after passes, no scratch or fault was observed or if any, there were a few or trace of scratches. Thus, these recording layers were excellent in abrasion resistance.

As stated above, recording layers covered with built-up lubricating layers formed from said alkylsilanes have low $\mu k$ values and are excellent in abrasion resistance, even when the lubricating layers are as thin as 500 Å or less in thickness. It proves from this example that the above built-up lubricating layers are also effective.

EXAMPLE 6

Films were formed from γ-(N,N-diheptadecylsuccinylamino)propyltrichlorosilane by the following methods:

LB method: A 1 mM chloroform solution of said silane was spread on the surface of pure water used as a sub-phase, and monomolecular films formed in this way were built up successively over a substrate.

Adsorption method: A substrate was immersed in a $5 \times 10^{-2}$ M benzene solution of said silane with stirring and after 20 minutes, the substrate was taken up, washed with chloroform and pure water, and dried.

Spin coating method: The same solution (5 cc) as used in the adsorption method was taken with a glass pipette, and applied on a substrate while spinning it at 2000 rpm for 20 seconds, and dried while spinning it at 3000 rpm for 20 seconds.

The substrates used were prepared by vapor deposition of recording layers (2000 Å thick) of Co-Cr on glass plates. Table 5 shows the $\mu k$ values of the thus prepared lubricating layers in the initial stage of passes and variations in the $\mu k$ values during the pass. The test conditions were as follows: friction head=6R SUJ 2, w=5 gf, and v=0.5 mm/s.

TABLE 5

| Film forming method | $\mu k$ | |
| --- | --- | --- |
| | Initial stage | Variation during pass |
| LB | 0.18 | Sliding was smooth |
| Adsorption | 0.20 | Sliding was smooth |
| Spin coating | 0.25 | Largely varied |

The $\mu k$ value of the sample prepared by the spin coating method was as high as 0.25 in the initial stage of passes and additionally varied largely in the repeated passes; thus the tracing was very unstable. In contrast, the $\mu k$ values of the samples prepared by the LB method and the adsorption method were as low as 0.18 and 0.20, respectively, in the initial stage and did not vary during the repeated passes; thus these samples showed smooth sliding. It is considered that the inferior sliding characteristics of the sample prepared by the spin coating method may be due to the arrangement of alkylsilane molecules on the substrate which are not favorably oriented toward the substrate or crosslinked with one another.

Unlike this, recording media having stable sliding characteristics are obtained as shown above, when built-up films are formed with the alkylsilane on the recording media by the LB method or the adsorption method.

EXAMPLE 7

Figure 4:
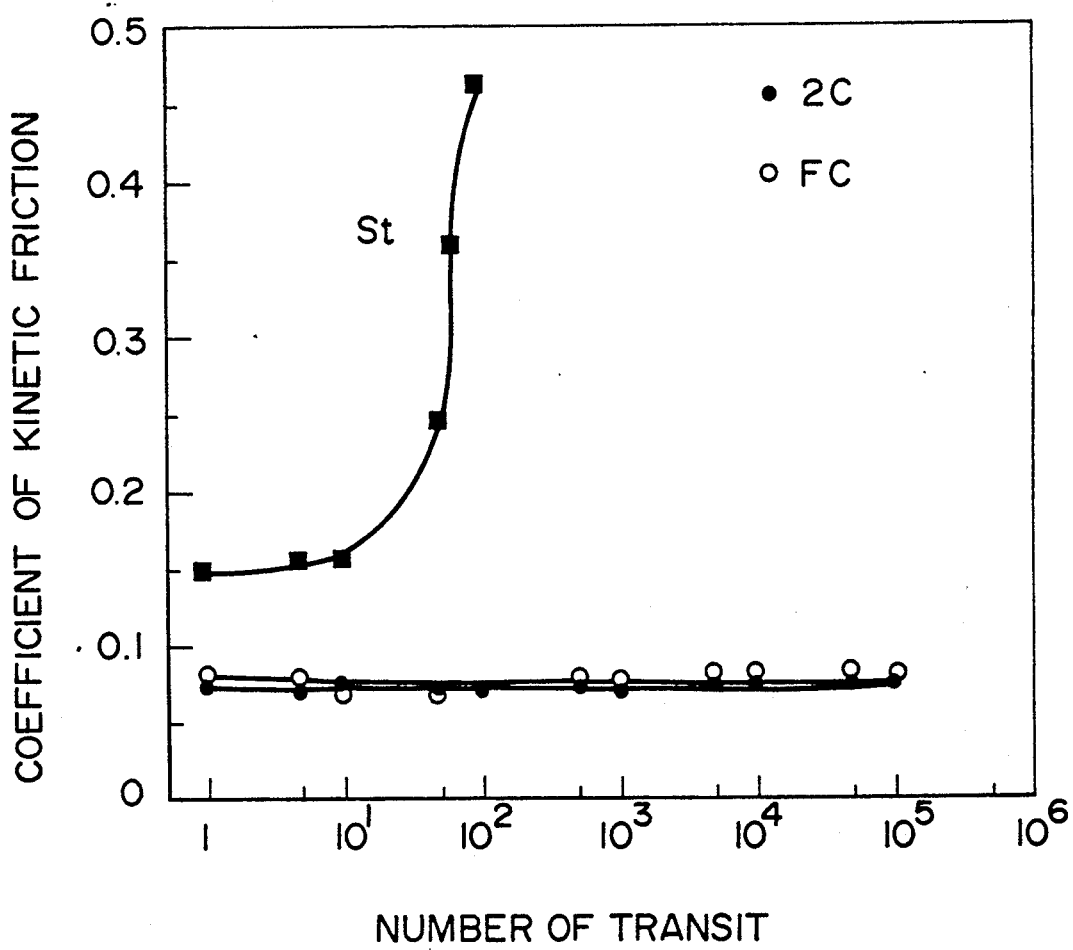
FIG. 4 is a chart showing the results of the test in Example 7.

On glass substrates were formed several monomolecular layers from γ-(N,N-dioctadecylsuccinylamino)-propyltriethoxysilane (2C), 1H,1H,2H,2H-perfluorodecylamido-propyltriethoxysilane (FC), and stearic acid (St). These samples were subjected to a repeated-operation test under the conditions: friction head=6R SUJ 2, w=10 gf, and v=1.0 mm/s. Results of the test are shown in FIG. 4.

The result revealed that whereas the monomolecular layer formed with St was peeled off to some extent in about 20-30 passes and thereby the $\mu k$ value was raised remarkably, the monomolecular layers formed from the alkylsilanes showed nearly constant $\mu k$ values ranging from 0.07 to 0.09 up to at least 100,000 passes, that is, a smooth sliding property, thus proving to have excellent durability. It is considered that this is due to the very high bonding strength of alkylsilane molecules to the substrate and the extremely strong cohesive force between alkylsilane molecules. Accordingly, it proves that said alkylsilanes also provide monomolecular lubricating layers having excellent abrasion resistance during repeated operations.

EXAMPLE 8

A monomolecular layer was formed with γ-(N,N-dioctadecylsuccinylamino)propyltriethoxysilane (2C) on a 1500 Å thick magnetic recording layer of Co-Cr (Co:Cr ratio=80:20 wt %, confirmed by atomic absorption spectroscopy) which were formed previously by a continuous vapor deposition method on a 12-μm thick polyimide film, thereby preparing a recording medium (8 mm width×40 cm length). In this case, the recording layer surface on which the monomolecular layer was formed was allowed previously to be oxidized.

The medium untreated with any lubricant showed high friction from the initial stage of a repeated-operation test and after 50 passes, severe scratches were observed at the surface of this medium. In contrast, the recording medium covered with the monomolecular lubricant layer showed a constant $\mu k$ during 3000 passes or more and after these passes, practically no scratch or fault was found at this layer surface.

Thus, the recording medium covered with the monomolecular layer formed from the alkylsilane acquired excellent sliding characteristics and abrasion resistance.

What is claimed is:

1. A method for preparing lubricating layers for recording media, which comprises forming a thin layer on a recording medium of a magnetic metal coating on a substrate from a lubricant comprising an alkylsilane represented by the formula (I)

wherein at least one of $R_1$-$R_4$ is a linear or branched 16-22C hydrocarbon or 6-14C fluoro-hydrocarbon chain optionally containing at least one amino, or carboxy, or an ether bond and the remaining $R_1$14 $R_4$ are selected from the group consisting of halogen, alkoxy, carboalkoxy, carboxy, hydroxy and phenoxy, and
wherein the thin layer is formed by the Langmuir-Blodgett method or an adsorption method and has a thickness of up to 500 Angstroms.

2. The method of claim 1, wherein the thin layer is a monomolecular film.

3. The method of claim 1, wherein the thin layer formed with the alkylsilane is treated additionally with a solution of higher hydrocarbon or higher fluorohydrocarbon.

4. The method of claim 1 wherein the thin layer is treated additionally with a solution of a compound selected from the group consisting of saturated higher hydrocarbons, higher fluorocarbons, higher fatty acids, higher amides, and higher fatty alcohols.

* * * * *